UNITED STATES PATENT OFFICE.

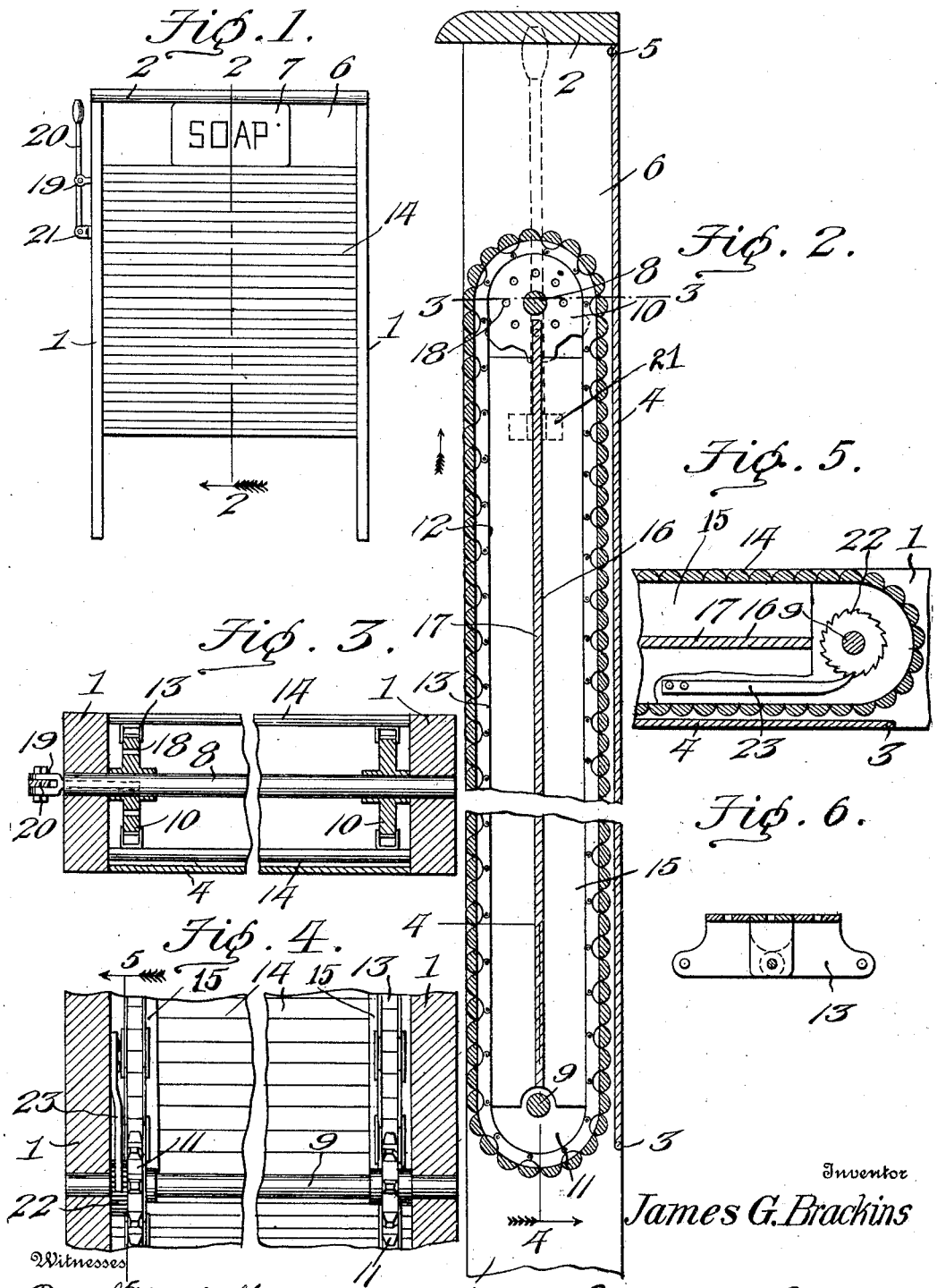

JAMES GARFIELD BRACKINS, OF TAZEWELL, TENNESSEE.

WASHBOARD.

997,111. Specification of Letters Patent. Patented July 4, 1911.

Application filed February 20, 1909, Serial No. 479,052. Renewed April 28, 1911. Serial No. 623,960.

*To all whom it may concern:*

Be it known that I, JAMES G. BRACKINS, a citizen of the United States, residing at Tazewell, in the county of Claiborne and State of Tennessee, have invented new and useful Improvements in Washboards, of which the following is a specification.

This invention relates to washboards and embodies an endless traveling belt provided with a rubbing surface, together with a compartment to receive a cake of soap and hold the same in position for contact with the surface of said belt, whereby the soap is automatically applied thereto during operation of the device.

The invention has for its objects to provide a comparatively simple and inexpensive device of this character wherein the movable rubbing surface may be locked in stationary position at will, one in which said belt will, when released, move automatically under the action of rubbing the clothes, and one in which retrograde movement of the belt is prevented at all times.

With these and other objects in view, the invention comprises the novel features of construction and combination of parts more fully hereinafter described.

In the accompanying drawings: Figure 1 is a front elevation of a washboard embodying the invention. Fig. 2 is a central, longitudinal section on an enlarged scale taken on the line 2—2 of Fig. 1. Fig. 3 is a cross section taken on the line 3—3 of Fig. 2. Fig. 4 is a detail, sectional view taken on the line 4—4 of Fig. 2. Fig. 5 is a sectional view taken on the line 5—5 of Fig. 4. Fig. 6 is a detail view, partly in section, of a pair of the links.

Referring to the drawings, it will be seen that the board as a whole embodies a pair of parallel side members or bars 1 connected at their upper ends by means of an end member or bar 2, there being pivoted at its lower edge, as at 3, to the side bars 1 a backing board or plate 4, which closes between the bars 1 and is maintained in closed position by means of a catch 5, while provided at the upper end of the board is a chamber or compartment 6 adapted to receive a cake of soap 7, as in Fig. 1.

Journaled at their ends in suitable bearing openings in the bars 1 is a pair of relatively spaced shafts 8 and 9, on which are fixed sprocket wheels 10 and 11 on which are arranged for travel a pair of endless chain belts 12, each composed of a series of pivotally connected links 13 to which are attached transversely extending slats 14 of substantially semi-circular form in cross section, which contact at their ends with the side bars 1 and conjointly form a ribbed or corrugated rubbing surface, while attached respectively to the inner faces of the side bars 1 are two pairs of cleats 15 forming grooves 16 designed to receive the ends of a central partition 17 extended longitudinally of the washboard at the center of the movable rubbing surface. One of the wheels 10 is provided with a concentric row of openings or perforations 18, any one of which may receive a locking pin 19 pivoted to an operating lever 20 in turn pivoted at its lower end to a bearing 21 attached to the adjacent side bar 1, while fixed on the lower shaft 9 is a toothed ratchet 22 adapted for engagement by the end of a spring pawl 23 to lock the shaft against reverse rotation and prevent movement of the endless belt in one direction.

In practice, the board is used in the ordinary manner by rubbing the clothes back and forth over the rubbing surface formed by the slats 14, the endless traveling belt or table formed by said slats being normally locked against movement owing to engagement of the pin 19 with one of the perforations 18. When it is desired to soap the surface of the board, the lever 20 is swung outwardly, thus carrying the locking pin 19 to non-engaging position, whereupon the belt will during upward movement of the fabric travel in the direction indicated by the arrow in Fig. 2, whereby the soap, in contact with which the table travels, will coat the faces of the slats from which the soap is taken by the fabric during the rubbing operation. When the upper shaft 8 is released owing to disengagement of the locking member 19 with the adjacent sprocket 10, the belt may travel freely in one direction but will be prevented from retrograde action owing to engagement of the pawl 23 with the ratchet 22. The slats 14 travel at their ends against the edges of the cleats 15, thus preventing sagging of the rubbing surface, while the backboard 4 protects the movable surface from injury owing to pressure of the board against the edge of the tub and the partition 16 prevents the water from passing through the slats of the front lead of the belt to the slats of the rear lead, thereby obviating possibility of the soap being washed from said slats before they come into action.

Having thus described my invention, what I claim is:

In a device of the character described, a frame including a pair of side bars, shafts journaled in said side bars at suitable distances from the upper and lower ends of the same, sprocket wheels upon said shafts, one of said sprocket wheels being provided with a concentric series of apertures, a lever fulcrumed upon one of the side bars, a pin pivotally connected with the lever and adapted to engage one of the apertures in the sprocket wheel, endless chains engaging the sprocket wheels adjacent to the side bars of the frame, transversely disposed slats carried by the chains and forming an endless corrugated apron, cleats secured upon the inner faces of the side bars and supporting the endless chains, pawl and ratchet means to prevent the endless corrugated apron from moving in one direction, a cross bar connecting the upper ends of the side bars of the frame, and a back member suitably connected with the side bars and coöperating with the cross bar, the side bars and the upper end of the endless corrugated apron to constitute a soap receptacle.

In testimony whereof, I affix my signature in presence of two witnesses.

JAMES GARFIELD X BRACKINS.
his mark

Witnesses:
Jno. P. Davis,
Jas. A. Day.

Copies of this patent may be obtained for five cents each, by addressing the "Commissioner of Patents, Washington, D. C."